Figure 1:
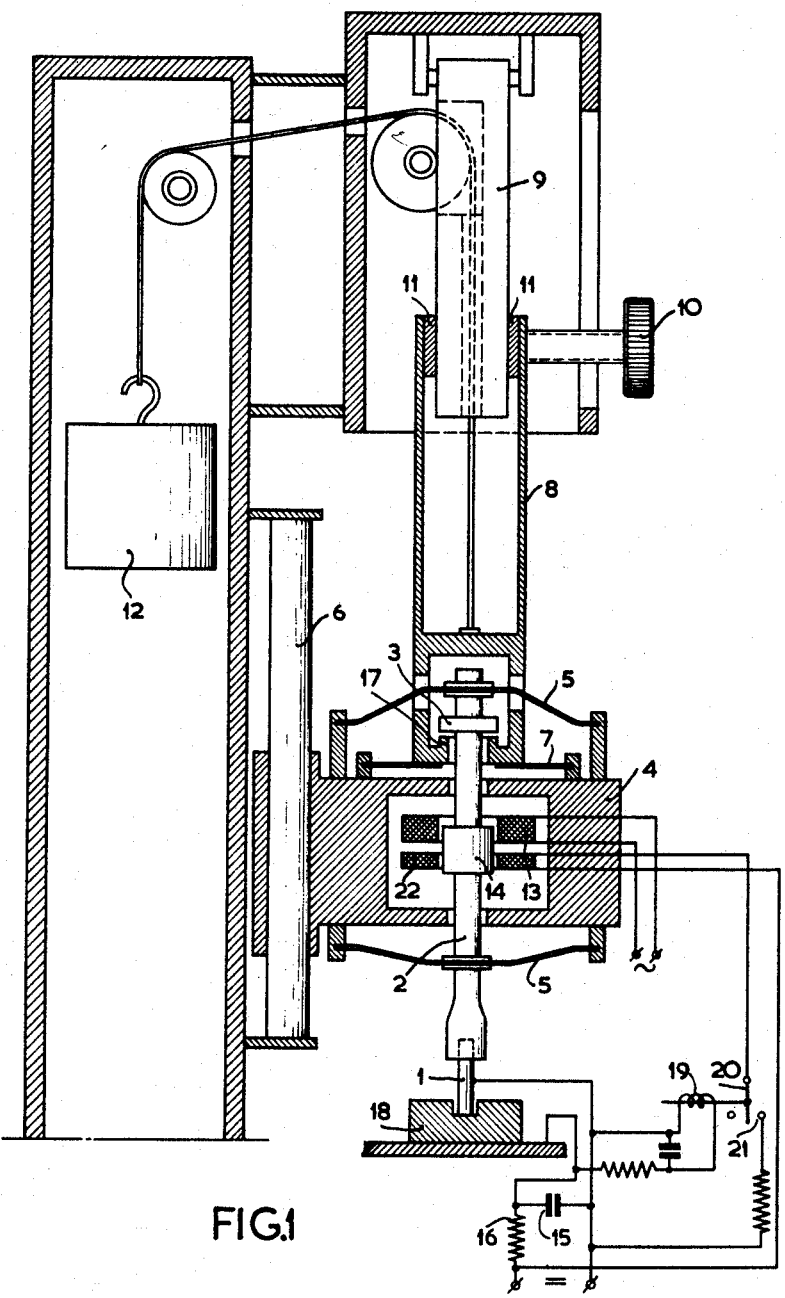

May 19, 1964     H. E. DE BRUYN     3,134,011
SPARK EROSION MACHINE
Original Filed Dec. 23, 1959     2 Sheets-Sheet 1

INVENTOR
HENDRIK E. DE BRUYN
BY
AGENT

May 19, 1964  H. E. DE BRUYN  3,134,011
SPARK EROSION MACHINE

Original Filed Dec. 23, 1959  2 Sheets-Sheet 2

INVENTOR
HENDRIK E. DEBRUYN
BY
AGENT

United States Patent Office 3,134,011
Patented May 19, 1964

3,134,011
SPARK EROSION MACHINE
Hendrik Elias de Bruyn, Delft, Netherlands, assignor to North American Philips Company, Inc., New York, N.Y., a corporation of Delaware
Continuation of abandoned application Ser. No. 861,673, Dec. 23, 1959. This application Dec. 4, 1961, Ser. No. 159,476
Claims priority, application Netherlands Jan. 13, 1959
9 Claims. (Cl. 219—69)

This invention relates to spark erosion metal cutting machines of the type described in British patent specification 800,061. As disclosed in said British patent, such machines comprise an electrode which is periodically brought into contact with the workpiece by means of an electromagnetic device operated by alternating current. Arcing is produced between the electrode and the workpiece due to a periodically discharged capacitor electrically connected to said electrode. An electrode holder is suspended in a resilient manner with a guide member which is coupled to the electromagnetic device. The guide member is supported by means of a friction member. The electrode holder is connected to the guide member by an abutment stop which is spaced from the guide member such that after the electrode begins to cut into a workpiece, the stop abuts against the guide member which is thereby slightly displaced towards the workpiece. In general the friction is set to a suitable value by means of an adjustable member.

In forming apertures with such a machine automatic control of the electric drive or arc producing potential may involve difficulties when the workpiece is pierced by the electrode, or when the electrode and/or the aperture, become conical due to wear. Under these conditions it is possible that at the end of its stroke the vibrating electrode penetrates slightly into the workpiece like a wedge as a consequence of which said automatic control might no longer operate satisfactorily due to a short-circuit between the electrode and workpiece during a part of the vibrations period, and sometimes even a complete short during a complete vibration period.

The object of the present invention is to mitigate this drawback.

According to the invention, arc erosion machines are provided with a balance type device adjusted so that, if the friction member is disengaged, the electromagnetic device with guide member and electrode would recede from the workpiece under the influence of the balancing means, but if friction is properly maintained it would not. Also, according to the invention when an undue short between the electrode and the workpiece exists, a relay connected between these two elements is energized to close a contact, as a result of which a direct current is also supplied to the electromagnetic device which produces at least approximately the same flux as the peak value of the flux produced by the alternating current.

In the case of an alternating current energization at a frequency of 50 c./s. of the electromagnetic device, the electrode will be made to vibrate at a frequency of 100 c./s. and will collide with the workpiece 100 times per second. If in the case of an undue short a direct voltage is also applied, the electromagnetic device will be energized at a frequency of only 50 c./s. but with approximately double the amplitude. The reaction forces thus transmitted to the support are now great enough to overcome the adjusted friction, as a result of which the electromagnetic device together with the support and electrode recedes from the workpiece under the influence of the adjusted unbalance, so that the electrode is pulled away from the workpiece. The short being thus removed, the relay resumes its initial state, so that the direct voltage is cut off and normal operation is resumed automatically. This is repeated when a short tends to occur again.

In order that the invention may be readily carried into effect, it will now be described in greater detail by way of example, with reference to the accompanying drawings, in which—

Figure 2:
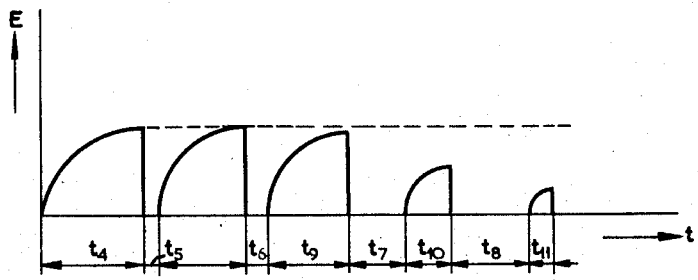
Figure 3:
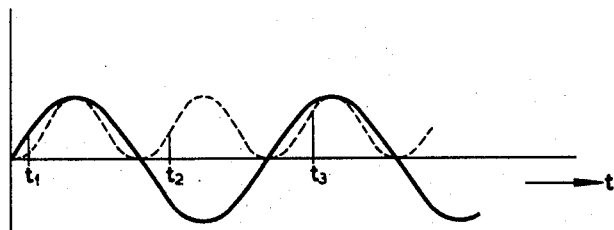
Figure 4:
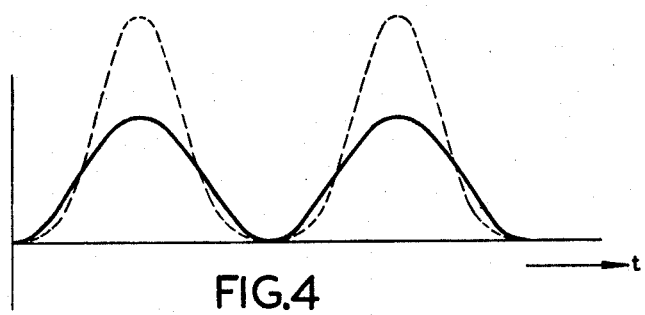

FIG. 1 shows a spark erosion machine according to the invention,
FIG. 2 shows a charging curve of the capacitor, and
FIGS. 3 and 4 show, in broken lines, the forces along the ordinate as a function of the time $t$ at 100 c./s. and 50 c./s. respectively.

In FIG. 1, an electrode 1 is provided in a holder 2 having an abutment stop 3. The holder is suspended in a resilient manner with an electromagnetic device 4 by means of the spring blades 5. The device 4 is guided by a member 6 and connected, through the spring blade 7, to the guide member 8 which is guided by the support 9. The friction between the support 9 and the pads 11 secured to the guide member 8 is adjustable by means of a screw 10. The device 2, 4, 8, etc. is overbalanced by a balance weight 12 and associated pulley and cable means.

This balancing means is set so that when screw 10 is unscrewed and the pads 11 are disengaged, the device 2, 4, 8 ascends under the influence of the larger weight of 12. During operation this is prevented by the adjusted friction of the means 10—11.

If the coil 13 is energized with an alternating voltage of 50 c./s. the electrode holder 2 with soft-iron core 14 will be made to vibrate at a frequency of 100 c./s. The device 4 will also be made to vibrate by the reaction forces; consequently, forces will be transmitted to the member 8 through the spring blade 7. However, the screw 10 is adjusted so that the friction between the pads 11 and the support 9 is not overcome. This electrode collides with the workpiece 18 at said frequency, thus producing arcing as a result of the direct voltage set up at the capacitor 15 which is each time charged by the resistor 16.

After a period of operation, the opening in the workpiece becomes so deep that the stop 3 abuts against the edge 17 of the member 8 as a result of which the friction is overcome and the member 8, also the device 4 with the electrode 1 move downward slightly. The number of these impacts may be, for example, from 5 to 10 per second.

If the electrode 1 and/or the opening in the workpiece 18 gradually become conical, there is a tendency that the electrode will not longer clear i.e. will be short circuited with the workpiece. Thus, the electrode properly ascended and clearing the workpiece, for example, at the instant $t_1$ (FIG. 3), will now become detached from the workpiece only at a larger attraction of the electromagnetic device, for example, at the instant $t_2$, and then at a later time, for example, only at the instant $t_3$. In this figure, and also in FIG. 4 the solid line shows the flux cycle of the electromagnetic potential.

As a result of this, the charging time for the capacitor 15 decreases more and more, which is shown in FIG. 2. The range $t_4$ shows the normal charging time of the capacitor, at the end of which the capacitor is discharged when the electrode approaches the workpiece. In practice it is found that during time $t_5$ the electric contact between electrode and workpiece remains, after which the capacitor is charged again. Owing to the above described longer effective contact between electrode and workpiece, as a result of which the electrode (see FIG. 3) is invariably lifted clear of the workpiece at a later instant $t_1$, $t_2$, $t_3$, the instants at which short circuiting occures ($t_6$, $t_7$, $t_8$ in FIG. 2) invariably become longer, as a result of which the charging times $t_9$, $t_{10}$, $t_{11}$ become shorter and the capacitor voltage lower.

If, for example, as shown at the end of $t_{11}$, the capacitor voltage has become so low that the spark erosion is only slight and a permanent short-circuit tends to occur between electrode and workpiece (because in that case the electrode no longer ascends or clears the workpiece even at the peak value of the attraction as shown in FIG. 3) the armature of the relay 19 in FIG. 1 becomes de-energized and the contacts 20 and 21 are closed. As a result, the direct voltage for charging the capacitor 15 is supplied to the coil 22. The current through this coil supplies a flux which is nearly equal to the peak value of the flux supplied by the alternating current to the coil 13. The attractive forces consequently become much larger, which is shown in FIG. 4 and the frequency is halved to 50 c./s. thus increasing the amplitude of vibration. The device 4 will now be made to vibrate more vigorously by the reaction forces—which are much larger in this case—exerted on the electromagnetic device 4 by the coils 13, 22 atached to it. Larger reaction forces are transmitted to the guide member 8, via the spring blade 7, as a result of which the friction between the pads 11 and the support 9 is overcome. Owing to the larger weight of 12, the device 4, 8 ascends, as a result of which the electrode 1 becomes detached and the relay 19 is de-energized again. The direct voltage set up at the coil 22 is removed and the device is again made operative with the full capacitor voltage at the capacitor 15 so that again the full erosion capacity is available.

This application is a continuation of application Serial No. 861,673, filed December 23, 1959, now abandoned.

What is claimed is:

1. A spark erosion metal cutting machine comprising in combination an electrode, means for resiliently mounting said electrode, means for vibrating said electrode, electrical means for energizing said electrode, guide means operatively connected with said electrode, friction means for connecting said guide means with a support member, overbalancing means operatively connected with said electrode, and vibration modifying means connected with said means to vibrate said electrode to increase the amplitude of vibration of said electrode whereby the force of said friction means is overcome and said overbalancing means lifts said electrode, and means operative in response to a short circuit of said electrode to energize said vibration modifying means.

2. A spark erosion metal cutting machine according to claim 1 wherein said guide means is resiliently connected with said means for resiliently mounting said electrode.

3. A spark erosion metal cutting machine according to claim 1 wherein said means to vibrate said electrode comprise an electrode holder including a soft iron core, and electromagnetic means comprising an alternating current coil and a separate direct current coil.

4. A spark erosion metal cutting machine having a resiliently mounted electrode, electromagnetic means to vibrate said electrode, a movable guide means including means for frictionally restraining said movable guide means operatively connected with said electrode to advance said electrode toward a workpiece; an improved combination characterized by overbalancing means connected with said guide means and vibration modifying means connected with said electromagnetic means to increase the amplitude and decrease the frequency of vibration of said electrode, and means responsive to a short circuit between said electrode and workpiece to energize said vibration modifying means whereby said overbalancing means withdraws said electrode from the workpiece when said frictional restraint of said guide means is overcome by the increased amplitude of vibration of said electrode.

5. A spark erosion metal cutting machine according to claim 4 wherein said means responsive to a short circuit comprises a relay connected between the electrode and workpiece and a contact closed by operation of said relay, and said vibration modifying means comprises a source of direct voltage connected with said electromagnetic means by said contact.

6. A spark erosion machine according to claim 4 wherein said movable guide means is resiliently operatively connected with said electrode.

7. A spark erosion machine according to claim 5 wherein said electromagnetic means comprises separate coils one of which is connected with an alternating electric potential and the other to said direct voltage.

8. Apparatus for arc cutting a conductive workpiece comprising an electrode, means for energizing said electrode, movable means mounting said electrode relative to said workpiece, means operatively associated with said electrode and said mounting means for vibrating said electrode relative to said mounting means and simultaneously impart motion to said mounting means to advance said electrode toward said workpiece, and means operative in response to a short circuit between said electrode and workpiece for biasing said vibrating means and impart motion to said mounting means away from said workpiece.

9. Apparatus for arc cutting a conductive workpiece comprising an electrode, means for energizing said electrode, movable means mounting said electrode relative to said workpiece, means operatively associated with said electrode and said mounting means for resiliently suspending said electrode, means for vibrating said electrode relative to said mounting means and means to advance said mounting means toward said workpiece in response to vibration of said electrode, and means operative in response to a short circuit between said electrode and workpiece to modify the mode of vibration of said electrode to impart motion to said mounting means withdrawing said electrode from said workpiece.

References Cited in the file of this patent

UNITED STATES PATENTS

| | | |
|---|---|---|
| 2,461,798 | Anderson | Feb. 15, 1949 |
| 2,796,509 | Blake | June 18, 1957 |